United States Patent
Di et al.

(10) Patent No.: US 12,452,069 B2
(45) Date of Patent: Oct. 21, 2025

(54) INFORMATION VERIFICATION METHOD AND APPARATUS

(71) Applicant: Digital Currency Institute, The People's Bank of China, Beijing (CN)

(72) Inventors: Gang Di, Beijing (CN); Yang Gao, Beijing (CN); Mengwei He, Beijing (CN); Youcai Qian, Beijing (CN); Mingyu Cheng, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 151 days.

(21) Appl. No.: 18/564,535

(22) PCT Filed: May 26, 2022

(86) PCT No.: PCT/CN2022/095259
§ 371 (c)(1),
(2) Date: Nov. 27, 2023

(87) PCT Pub. No.: WO2022/247910
PCT Pub. Date: Dec. 1, 2022

(65) Prior Publication Data
US 2024/0259203 A1 Aug. 1, 2024

(30) Foreign Application Priority Data
May 27, 2021 (CN) .......... 202110585056.8

(51) Int. Cl.
*H04L 9/32* (2006.01)
*G06F 21/60* (2013.01)
(Continued)

(52) U.S. Cl.
CPC .......... *H04L 9/3218* (2013.01); *G06F 21/602* (2013.01); *G06F 21/6245* (2013.01); *G06F 21/64* (2013.01)

(58) Field of Classification Search
CPC ......... H04L 9/32; H04L 9/3218; G06F 21/60; G06F 21/602; G06F 21/62; G06F 21/6218; G06F 21/6245; G06F 21/64
See application file for complete search history.

(56) References Cited

U.S. PATENT DOCUMENTS 11,212,104 B2 * 12/2021 Lu .......... G06Q 20/40
2009/0300049 A1 12/2009 Zhang et al.
(Continued)

FOREIGN PATENT DOCUMENTS

CN 110224837 A 9/2019
CN 110995438 A 4/2020
(Continued)

OTHER PUBLICATIONS

The extended European search report of counterpart EP application No. 22810634.0, issued on Sep. 16, 2024.
(Continued)

Primary Examiner — D'Arcy Winston Straub
(74) Attorney, Agent, or Firm — The Sun IP Law (57) ABSTRACT

The present application relates to the technical field of computers, and discloses an information verification method and apparatus. A implementation of the method includes: constructing a constraint set of a zero-knowledge proof circuit, wherein the constraint set includes a range attribute verification condition; receiving a verifiable representation, using the verifiable representation as a secret input of the zero-knowledge proof circuit, and generating a personal information credential by means of the zero-knowledge proof circuit, wherein the verifiable representation is gen-
(Continued)

erated according to personal information to be verified; and in response to receiving decentralized identity information and a threshold value, which are sent by a verification system of a personal information credential, using the decentralized identity information and the threshold value as public inputs of the zero-knowledge proof circuit, and verifying, by the zero-knowledge proof circuit, whether the personal information credential satisfies the constraint set.

20 Claims, 4 Drawing Sheets

(51) Int. Cl.
*G06F 21/62* (2013.01)
*G06F 21/64* (2013.01)

(56) References Cited

U.S. PATENT DOCUMENTS

| 2020/0403805 | A1* | 12/2020 | Steele | H04L 9/3242 |
|---|---|---|---|---|
| 2021/0044428 | A1 | 2/2021 | Hwang et al. | |
| 2021/0287770 | A1* | 9/2021 | Anderson | G16H 40/20 |
| 2021/0328806 | A1* | 10/2021 | Yang | H04L 9/3247 |
| 2022/0294653 | A1* | 9/2022 | Li | G06F 21/64 |
| 2023/0051854 | A1* | 2/2023 | Manian | G06Q 20/3674 |

FOREIGN PATENT DOCUMENTS

| CN | 111211909 A | 5/2020 |
|---|---|---|
| CN | 111932261 A | 11/2020 |
| CN | 112199721 A | 1/2021 |
| CN | 112288434 A | 1/2021 |
| CN | 112291245 A | 1/2021 |
| CN | 112818370 A | 5/2021 |
| CN | 113221148 A | 8/2021 |

OTHER PUBLICATIONS

Ivan Dagrd et al:"Balancing Privacy and Accountability in Blockchain Transactions", IACR, Internationalassociation for Cryptologic Research, vol. 20201202: 150648 Dec. 2, 2020 (Dec. 2, 2020) , pp. 1-52, XP061041779.

Liu Dongxiao et al:"Secure and Efficient Distributed Network Provenance for IoT: A Blockchain-Based Approach", IEEE Internet of Things Journal, IEEE, USA, vol. 7, No. 8, Apr. 17, 2020 (Apr. 17, 2020) , pp. 7564-7574 , XP011805484.

Benedikt Bnz et al:"Bulletproofs: Short Proofs for Confidential Transactions and More", IACR, International Association for Cryptologic Research, vol. 20180701:235657 Jul. 2, 2018 (Jul. 2, 2018) , pp. 1-45, XP061026812.

Cong Deng et al:"Cuproof: A Novel Range Proof with Constant Size",IACR, International Association for Cryptologic Research, vol. 20210507: 132830 May 7, 2021 (May 7, 2021) , pp. 1-27, XP061059170.

DIDA White Paper Blockchain Technology Space, Distributed Digital Identity, pp. 1-4, Oct. 24, 2020.

The search report of the priority CN patent application No. 202110585056.8 issued on May 26, 2023.

* cited by examiner

* # INFORMATION VERIFICATION METHOD AND APPARATUS

CROSS-REFERENCE TO RELATED APPLICATION

The present disclosure claims the priority of Chinese Patent Application No. 202110585056.8, filed on May 27, 2021, and entitled "Information Verification Method and Apparatus", the entire contents of which are herein incorporated by reference as a part or all of the present application.

TECHNICAL FIELD

The present disclosure relates to the technical field of cryptography, and in particular, to an information verification method and apparatus.

BACKGROUND

A decentralized identity (Decentralized Identity) is an implementation of an autonomy identity. The decentralized identity advocates a mode in which decentralized infrastructure is configured to change the user digital identity in a centralized application, so that everyone has the right to access and control his/her digital identity. When verified by a verifier, a current decentralized identity system may often obtain original data of a personal information credential, i.e. the verifier may acquire the plaintext information of a credential holder, so that the information of the holder is directly exposed to the verifier. Although there is an existing method for sampling range attributes in a holder credential and performing assertion Merkel tree construction, in which the plaintext information is expanded to a certain section, the division of the section also leaks the real information of the user, and the division granularity of the section is difficult to grasp, which will result in the problem that a constructed Merkel tree is too large to generate a huge amount of data and excessively low efficiency.

During the process of implementing the present disclosure, the inventor finds that at least the following problems exist in the prior art: the real information of the user is directly exposed, resulting in leakage of sensitive information of the user, and the verification efficiency is low.

SUMMARY

In view of this, embodiments of the present disclosure provide an information verification method and apparatus, which may protect sensitive information during user information verification while maintaining a decentralized identity system, thereby avoiding directly showing plaintext of real information of a user, and the verification efficiency is high.

In order to achieve the above objectives, at least some of the embodiments of the disclosure provide an information verification method.

The information verification method, including: constructing a constraint set of a zero-knowledge proof circuit, wherein the constraint set includes a range attribute verification condition, and the range attribute verification condition is used for verifying whether an attribute value of personal information is within a constraint range of a threshold value; receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential based on personal information to be verified; and in response to receiving decentralized identity information and the threshold value, which are sent by a verification system of the personal information credential, using the decentralized identity information and the threshold value as public inputs of the zero-knowledge proof circuit, and verifying, by the zero-knowledge proof circuit, whether the personal information credential satisfies the constraint set.

As at least one alternative embodiment, the issuing system is configured to generate the personal information credential based on the personal information to be verified, the personal information credential includes a signature of the issuing system, the holding system is configured to perform encapsulation based on the personal information credential issued by the issuing system to obtain the verifiable representation, and the verifiable representation includes a signature of the holding system; and the constraint set further includes a first constraint condition and a second constraint condition, wherein the first constraint condition is used for verifying the signature of the holding system, and the second constraint condition is used for verifying the signature of the issuing system.

As at least one alternative embodiment, the method further including: generating a key of the holding system and a key of the verification system, the key of the holding system is used for generating the personal information credential, and the key of the verification system is used for verifying the personal information credential.

As at least one alternative embodiment, using the verifiable representation as the secret input of the zero-knowledge proof circuit, and generating the personal information credential by means of the zero-knowledge proof circuit, includes: using the verifiable representation as a parameter of an assignment function of the zero-knowledge proof circuit, and assigning an attribute variable of the personal information credential in the constraint set of the zero-knowledge proof circuit by means of the assignment function to obtain the attribute value of the personal information; and using the key of the holding system as a parameter of a proof generation function in a preset zero-knowledge proof algorithm, and generating the personal information credential by invoking the proof generation function.

As at least one alternative embodiment, the decentralized identity information sent by the verification system of the personal information credential includes first decentralized identity information of the issuing system and second decentralized identity information of the holding system; and wherein using the decentralized identity information and the threshold value as public inputs of the zero-knowledge proof circuit, and verifying, by the zero-knowledge proof circuit, whether the personal information credential satisfies the constraint set, includes: using a public key of the issuing system in the first decentralized identity information, a public key of the holding system in the second decentralized identity information, the threshold value and the key of the verification system as parameters of a proof verification function in the preset zero-knowledge proof algorithm, and verifying the personal information credential by invoking the proof verification function.

As at least one alternative embodiment, the preset zero-knowledge proof algorithm is one of a zero-knowledge succinct non-interactive arguments of knowledge algorithm, a zero-knowledge scalability transparent arguments of knowledge algorithm, and a transparent zero-knowledge verifiable polynomial delegation algorithm.

As at least one alternative embodiment, the attribute value of the personal information includes at least one of age, height, weight, and account amount.

According to another aspect of the embodiments of the present disclosure, at least some embodiments of the present disclosure, an information verification apparatus is further provided.

The information verification apparatus, including: a constraint set construction module, configured to construct a constraint set of a zero-knowledge proof circuit, wherein the constraint set includes a range attribute verification condition, and the range attribute verification condition is used for verifying whether an attribute value of personal information is within a constraint range of a threshold value; a personal information credential generation module, configured to receive a verifiable representation, use the verifiable representation as a secret input of the zero-knowledge proof circuit, and generate a personal information credential by the zero-knowledge proof circuit, wherein the verifiable representation is generated by an issuing system of a personal information credential and a holding system of the personal information credential based on personal information to be verified; and a personal information credential verification module, configured to: in response to receiving decentralized identity information and the threshold value, which are sent by a verification system of the personal information credential, use the decentralized identity information and the threshold value as public inputs of the zero-knowledge proof circuit, and verify, by the zero-knowledge proof circuit, whether the personal information credential satisfies the constraint set.

According to yet another aspect of the embodiments of the present disclosure, at least some embodiments of the present disclosure, an electronic device is provided.

The electronic device, including: at least one processor; and a memory, configured to store at least one program, wherein when the at least one program is executed by the at least one processor, the at least one processor implement the information verification method provided in the embodiments of the present disclosure.

According to yet another aspect of the embodiments of the present disclosure, at least some embodiments of the present disclosure, a computer-readable medium is provided.

The computer-readable medium, wherein the computer-readable medium stores a computer program, wherein the computer program, when executed by a processor, implements the information verification method provided in the embodiments of the present disclosure.

Further effects of the above-mentioned non-customary optional modes will be described below in conjunction with specific embodiments.

BRIEF DESCRIPTION OF THE DRAWINGS

The drawings are configured to better understand the present disclosure, and do not constitute an improper limitation on the present disclosure, wherein.

DETAILED DESCRIPTION OF THE EMBODIMENTS

Exemplary embodiments of the present disclosure are described below in conjunction with the drawings, including various details of the embodiments of the present disclosure to facilitate understanding, and they should be considered as exemplary only. Accordingly, those ordinary skilled in the art should be aware that various changes and modifications may be made to the embodiments described herein without departing from the scope and spirit of the present disclosure. Likewise, descriptions of well-known functions and structures are omitted in the following description for clarity and conciseness.

Figure 1:
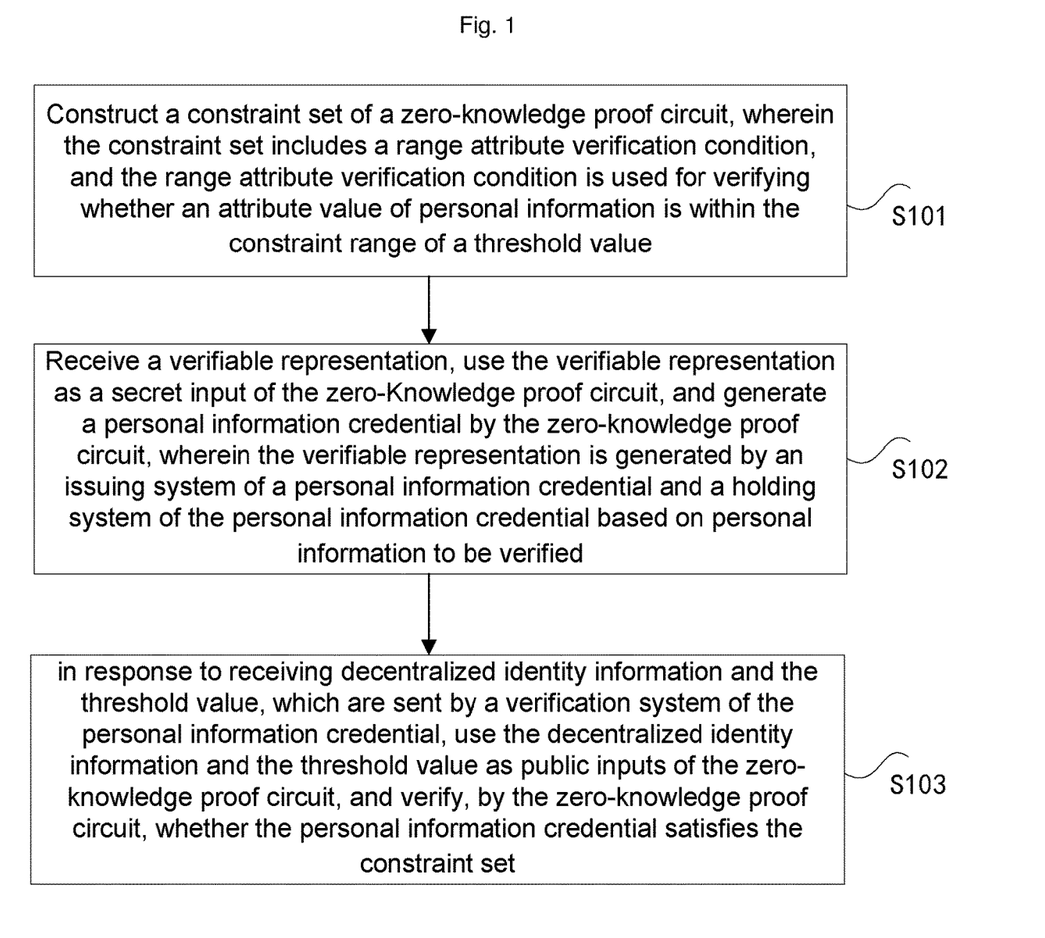
FIG. 1 is a schematic diagram of main steps of an information verification method according to an embodiment of the present disclosure.

FIG. 1 is a schematic diagram of the main steps of an information verification method according to an embodiment of the present disclosure. As shown in FIG. 1, the information verification method according to an embodiment of the present disclosure mainly includes the following steps S101 to S103.

At the step S101: constructing a constraint set of a zero-knowledge proof circuit, wherein the constraint set includes a range attribute verification condition, and the range attribute verification condition is used for verifying whether an attribute value of personal information is within a constraint range of a threshold value.

The attribute value of the personal information may include at least one of age, height, weight, and account amount.

It is taken as an example that the attribute value of the personal information is a certain age, the range attribute verification condition is used for, for example, verifying whether the age in the personal information is greater than or equal to 18 years old, wherein 18 years old is an example of the threshold value, greater than or equal to 18 years old indicates being within the constraint range of the threshold value.

At the step S102: receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential based on personal information to be verified.

In an embodiment, the issuing system is configured to generate the personal information credential based on the personal information to be verified, and the personal information credential contains a signature of the issuing system. The holding system is configured to perform encapsulation based on the personal information credential issued by the issuing system to obtain the verifiable representation, and the verifiable representation includes a signature of the holding system.

The personal information credential includes an attribute variable, and the attribute variable is assigned to obtain the attribute value in the personal information credential, i.e. the attribute value of the personal information.

In the embodiment of the present disclosure, the constraint set of the zero-knowledge proof circuit may further includes a first constraint condition and a second constraint condition, wherein the first constraint condition is used for verifying the signature of the holding system to the verifiable representation, and the second constraint condition is used for verifying the signature of the issuing system on the personal information credential.

The issuing system is a credential issuing system, which is a computer system of an issuer (i.e., a credential issuer), the holding system is a computer system of a holder, the issuer is typically an institution, the issuer may issue the personal information credential, the holder may be a person or an institution, and the holder may hold the personal information credential.

In the embodiment of the present disclosure, the personal information credential is a verifiable credential (abbreviated as VC), which is referred to as a credential for short.

The information verification method in the embodiment of the present disclosure further includes: generating a key of the holding system and a key of a verification system, wherein the key of the holding system is used for generating the personal information credential, and the key of the verification system is used for verifying the personal information credential.

In the embodiment of the present disclosure, the personal information credential is a zero-knowledge proof.

In the embodiment of the present disclosure, using the verifiable representation as the secret input of the zero-knowledge proof circuit, and generating the personal information credential by means of the zero-knowledge proof circuit, specifically includes: using the verifiable representation as a parameter of an assignment function of the zero-knowledge proof circuit, and assigning the attribute variable of the personal information credential in the constraint set of the zero-knowledge proof circuit by the assignment function to obtain the attribute value of the personal information; and using the key of the holding system as a parameter of a proof generation function in a preset zero-knowledge proof algorithm, and generating the personal information credential by invoking the proof generation function.

The generated personal information credential has a proof with respect to the personal information (including the attribute value of the personal information), and a proof for verifying whether the personal information credential includes the signature of the issuing system, and whether the verifiable representation includes the signature of the holding system.

At the step S103: in response to receiving decentralized identity information and the threshold value, which are sent by the verification system of the personal information credential, using the decentralized identity information and the threshold value as public inputs of the zero-knowledge proof circuit, and verifying, by the zero-knowledge proof circuit, whether the personal information credential satisfies the constraint set.

The verification system is a computer system of a verifier, the verifier may be a person or an institution, and the verifier verifies, by the zero-knowledge proof circuit of the embodiment of the present disclosure, whether the personal information credential satisfies the constraint set to verify the personal information.

The decentralized identity information sent by the verification system of the personal information credential includes first decentralized identity information of the issuing system and second decentralized identity information of the holding system.

The first decentralized identity information of the issuing system is DID (decentralized identity) information of the issuer, and the second decentralized identity information of the holding system is the DID information of the holder. The DID information includes a DID identifier and a DID document.

The verification system of the personal information credential may acquire the first decentralized identity information from the issuing system and acquire the second decentralized identity information from the holding system in advance.

In the embodiment of the present disclosure, using the received decentralized identity information and the threshold value as public inputs of the zero-knowledge proof circuit, and verifying, by the zero-knowledge proof circuit, whether the personal information credential satisfies the constraint set, includes: using a public key of the issuing system in the first decentralized identity information, a public key of the holding system in the second decentralized identity information, the threshold value and the key of the verification system as parameters of a proof verification function in the preset zero-knowledge proof algorithm, and verifying, by invoking the proof verification function, whether the proof with respect to the personal information (including the attribute value of the personal information) in the personal information credential satisfies the constraint set. For example, verifying whether the age (the attribute value) of a person is greater than or equal to 18 years old (the threshold value), verifying whether the personal information credential includes the signature of the issuing system, and verifying whether the verifiable representation includes the signature of the holding system.

The preset zero-knowledge proof algorithm may be one of a zero-knowledge succinct non-interactive arguments of knowledge algorithm (zk-SNARKs), a zero-knowledge scalability transparent arguments of knowledge algorithm (zk-STARK), and a transparent zero-knowledge verifiable polynomial delegation algorithm (zk-VPD).

In the embodiment of the present disclosure, the zero-knowledge proof is combined with the decentralized identity, thereby realizing privacy protection of data during user information verification under the condition that the centralized storage of a digital identity and a password is canceled, therefore it can be effectively ensured that the range attribute type data of a certifier is completely not leaked, the application range is wide, and the method can be applicable to scenarios of verifying age, height, weight, account amount and other range attributes.

Figure 2:
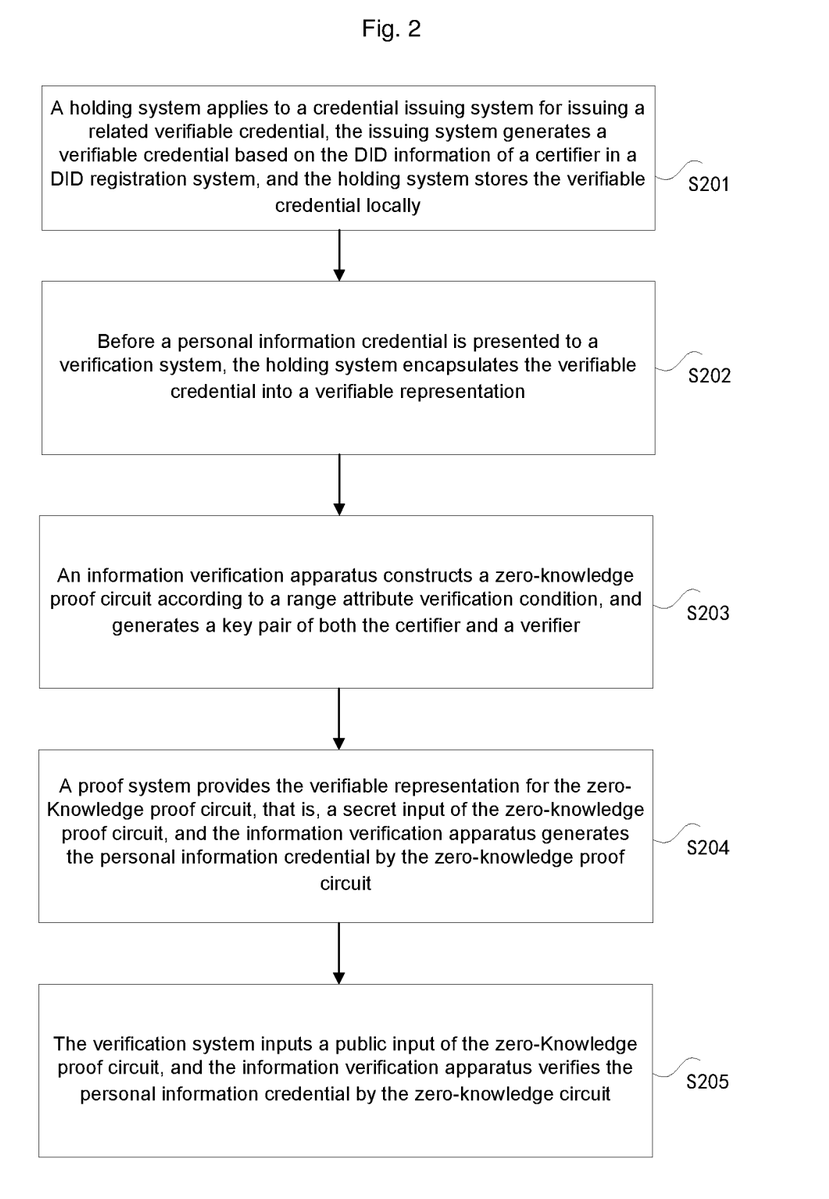
FIG. 2 is a schematic diagram of an information verification flow according to an embodiment of the present disclosure.

FIG. 2 is a schematic diagram of an information verification flow according to an embodiment of the present disclosure.

As shown in FIG. 2, the information verification flow according to an embodiment of the present disclosure may implement decentralized identity range attribute verification based on a zero-knowledge proof, and mainly includes the following steps:

At step S201: a holding system applies to a credential issuing system for issuing a related verifiable credential (VC for short), the issuing system generates a verifiable credential based on the DID information (including a DID identifier and a DID document) of a certifier in a DID registration system, and the holding system stores the verifiable credential locally.

The certifier is a holder, and the DID registration system is a computer system which stores the DID information of the holder.

At step S202: before a personal information credential is presented to a verification system, the holding system encapsulates the verifiable credential into a verifiable representation (VP for short).

At step S203: an information verification apparatus according to an embodiment of the present disclosure constructs a zero-knowledge proof circuit based on a range attribute verification condition, and generates a key pair of both the certifier and a verifier, i.e., a key pair composed of a key of the holding system and a key of the verification system.

The construction of the zero-knowledge proof circuit based on the range attribute verification condition is mainly to construct the constraint set of the zero-knowledge proof circuit.

At step S204: a proof system provides the verifiable representation for the zero-knowledge proof circuit, i.e., a secret input of the zero-knowledge proof circuit, and the information verification apparatus according to the embodiment of the present disclosure generates the personal information credential by the zero-knowledge proof circuit.

The proof system is a computer system of the certifier, in the embodiment of the present disclosure, since the certifier is the holder, the proof system is the holding system.

At step S205: the verification system inputs a public input of the zero-knowledge proof circuit, and the information verification apparatus according to the embodiment of the present disclosure verifies the personal information credential by the zero-knowledge circuit.

The decentralized identity (Decentralized Identity) information of the user is stored in a blockchain, and the identity information is composed of a DID identifier and a DID document. The DID identifier is a uniform resource identifier (URI) consisting of three parts, i.e., a prefix, a method and a unique identification character string; the DID document is composed of a group of attributes, which are stored in the form of key-value pairs, and describe verification methods (e.g., a public key) and services related to a DID topic, and are serialized according to a particular grammar. Serving as a URI, the DID associates a DID owner with the DID document thereof, thus allowing the external to perform trusted interaction with the main body, and the DID owner may prove the control thereof on the DID. The DID information of the user is stored in the form of the blockchain as the underlying infrastructure of a DID system.

The issuing system generates the verifiable credential (VC) based on the DID information of the holder, and the verifiable credential includes a unique identifier of the verifiable credential, the DID of a credential issuer, a credential issuing time, the content of a credential declaration, and a signature of the issuer on the credential (i.e., the signature of the issuing system), etc. The content of the credential declaration includes personal information, such as identity card information.

The proof system (i.e., the holding system) encapsulates the verifiable credential (VC) to obtain the verifiable representation (VP), and adds signature information of the verifiable representation (VP) to prevent a replay attack.

It is taken as an example that the zero-knowledge proof circuit constructed in the present embodiment uses a zero-knowledge succinct non-interactive arguments of knowledge (zk-SNARKs), the zk-SNARKs algorithm is a zero-knowledge succinct non-interactive knowledge argumentation, which enables the verifier to successfully verify the authenticity recited by the certifier by using cryptology-related technologies such as homomorphic hiding and polynomial interpolation on the premise of not leaking secret information owned by the certifier. In an implementation, the construction of the zero-knowledge proof circuit needs to satisfy and verify the following content, i.e., the following constraint set is constructed:

(1) a first constraint condition: verifying the signature of the holder to the verifiable representation (VP), i.e., verifying whether the verifiable representation includes the signature of the holding system;

(2) a second constraint condition: verifying the signature of the issuer to the verifiable credential (VC), i.e., verifying whether the personal information credential includes the signature of the issuing system; and (3) a range attribute verification condition: verifying whether a range attribute satisfies a condition, i.e., verifying whether the attribute value of the personal information is within the constraint range of a threshold value.

In the embodiment of the present disclosure, circuit constraints are constructed based on an expression to be verified, wherein the public input of the zk-SNARKs algorithm is the DID of the certifier (i.e., second decentralized identity information of the holding system), the DID of the issuer of the verifiable credential (i.e., first decentralized identity information of the issuing system), and an attribute range threshold value (i.e., a threshold value used for judging whether the attribute value of the personal information is within a certain constraint range), and the secret input is the verifiable representation (VP) provided by the proof system. In this step, only related variables are created, a constraint relationship between the variables is established, and meanwhile, the information verification apparatus according to the embodiment of the present disclosure further generates keys of the certifier and the verifier (i.e., respective keys of the holding system and the verification system).

The proof system according to the embodiment of the present disclosure provides the verifiable representation (VP), and the zero-knowledge proof (i.e., the personal information credential) may be generated by using the keys generated in the step S203.

The verification system provides the keys generated in the step S203 and the public input of the zero-knowledge proof circuit, and the information verification apparatus according to the embodiment of the present disclosure verifies whether the generated zero-knowledge proof satisfies the constructed constraint set.

The information verification flow according to the embodiment of the present disclosure is further described in detail below with examples.

An issuing system A issues, to a holding system B, a verifiable credential (VC) that stores personal information (e.g., identity card information), a verification system C verifies whether the age of the holder in the verifiable representation (VP) encapsulated by the holding system is greater than or equal to 18 years old, wherein the age is the range attribute in the personal information credential of the holder, and the value of the age of the holder is the attribute value of the personal information.

The verifiable credential (VC) issued by the issuing system to the holding system includes the following information:

$$VC = (ID_{VC}, DID_A, Date_{VC}, DID_B, Name_B, Gender_B, Age_B, Sig_{VC})$$

wherein, $ID_{VC}$ represents the unique identifier of the verifiable credential (VC), $DID_A$ represents the DID identifier of the issuer, $Date_{VC}$ represents the issuing time of the verifiable credential (VC), $DID_B$ represents the DID identifier of the holder, $Name_B$, $Gender_B$, $Age_B$ represent the content declared by the verifiable credential (VC), i.e. the identity card information of the holder, and $Sig_{VC}$ represents the signature of the issuer to the verifiable credential (VC), i.e. the signature of the issuing system.

The holding system encapsulates the verifiable credential into the verifiable representation (VP), and the verifiable representation (VP) is in the following form:

$$VP = (VC, Sig_{VP})$$

wherein, $Sig_{VP}$ represents the signature of the holder to the verifiable representation (VP), i.e. the signature of the holding system.

The information verification apparatus according to the embodiment of the present disclosure constructs the zero-knowledge proof circuit in a Setup (initialization) stage, and constructs the constraint set as follows:

(1) signature (privateKey$_A$, VC)=Sig$_{VC}$, (the second constraint condition)
(2) signature (privateKey$_B$, VC)=Sig$_{VP}$, (the first constraint condition)
(3) $Age_B \geq Age_0$, (the range attribute validation condition)

wherein, a generate_constraints( ) function may be invoked to construct the above constraint set, the generate_constraints( ) function is a function used in the zero-knowledge proof circuit to construct constraints for generating a proof, and an add_rlcs_constraint( ) function in a zk-DNARKs open source library will be invoked therein to generate the constraint set, privateKey$_A$ and privateKey$_B$ respectively represent corresponding private keys in the DID information of the issuing system A and the holding system B, signature( ) represents a signature algorithm, and privateKey$_A$ represents a parameter of the signature algorithm in the second constraint condition; and privateKey$_B$ represents a parameter of the signature algorithm in the first constraint condition; and $Age_0=18$, i.e. the threshold value. In the embodiment of the present disclosure, a key pair (proving key, verifying key) of both the holding system B and the verification system C is generated at the same time, wherein the proving key is the key of the holding system B, and the verifying key is the key of the verification system C.

The verifiable representation (VP) provided by the proof system (i.e., the holding system B) for the zero-knowledge proof circuit is used as the secret input of the zero-knowledge proof circuit, an assignment operation is performed on the attribute variable of the personal information credential in the constraint set of the zero-knowledge proof circuit, which is constructed in the Setup (initialization) stage, Ages is assigned, a generated_witness(VP) function may be invoked to perform the assignment operation, and the generated_witness(VP) function is an assignment function in the zero-knowledge proof circuit, which is configured to perform the assignment operation. The personal information credential, i.e., the zero-knowledge proof, may be generated by invoking a generate_proof (proving key) function. The generate_proof( ) function is a function provided by the ak-SNARKs for generating a final proof.

The verification system is configured to input the public input and the key of the zero-knowledge proof circuit, and a verify_proof (publicKey$_A$, publicKey$_B$, Age$_0$, verifying key) function may be invoked to verify the proof, wherein publicKey$_A$ and publicKey$_B$ respectively represent corresponding public keys in the DID information of the issuing system A and the holding system B (i.e., the public key of the issuing system and the public key of the holding system), and the verify_proof( ) function is a function provided by the ak-SNARKs for verifying the proof.

In the embodiment of the present disclosure, the credential holding system applies to the issuing system for issuing the related verifiable credential, the issuing system generates the verifiable credential according to the DID information of the certifier in the DID registration system, the holding system stores the verifiable credential locally, when the proof needs to be presented to the verification system, the holding system may encapsulate the verifiable credential into the verifiable representation, the information verification apparatus according to the embodiment of the present disclosure constructs the zero-knowledge proof circuit based on the range attribute verification condition, and the information verification apparatus generates the key pair, which is composed of the key of the proof system and the key of the verification system and is needed in the generation and verification of the zero-knowledge proof, and the proof system provides the verifiable representation for the zero-knowledge proof circuit, i.e. the secret input of the zero-knowledge proof circuit, the zero-knowledge proof is generated by the zero-knowledge proof circuit, the verification system inputs the public input of the zero-knowledge proof circuit, and the zero-knowledge proof is verified by the zero-knowledge proof circuit. In this way, a decentralized identity range attribute verification method based on zero-knowledge proof is realized, and on the premise of keeping a decentralized identity system, privacy protection is performed on the range attribute in the holder credential by using the zero-knowledge proof, thereby avoiding the problem that the credential holder shows the plaintext information when providing the identity information for the verifier, thus leaking the sensitive information of the user.

Figure 3:
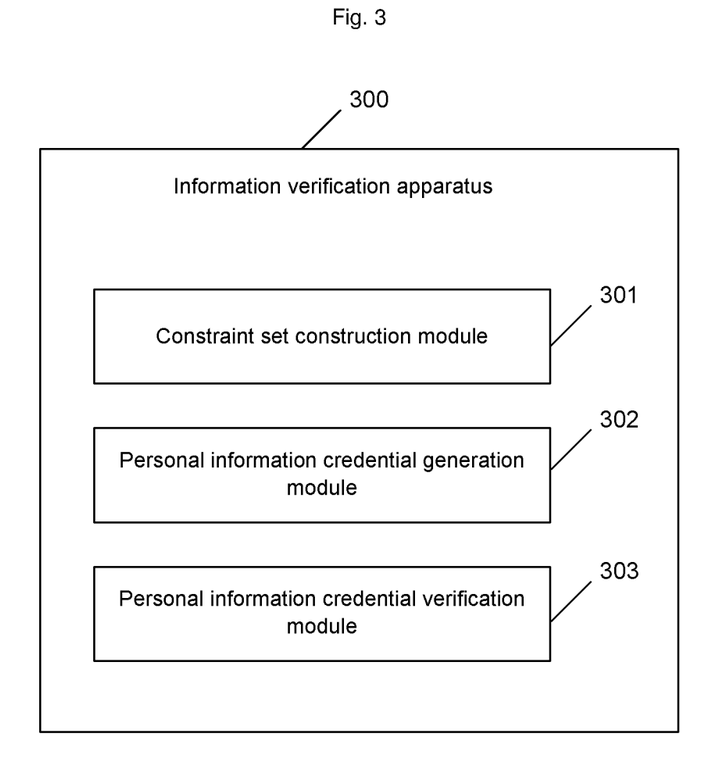
FIG. 3 is a schematic diagram of main modules of an information verification apparatus according to an embodiment of the present disclosure.

FIG. 3 is a schematic diagram of main modules of an information verification apparatus according to an embodiment of the present disclosure.

As shown in FIG. 3, the information verification apparatus 300 according to the embodiment of the present disclosure mainly includes: a constraint set construction module 301, a personal information credential generation module 302 and a personal information credential verification module 303.

The constraint set construction module 301 is configured to construct a constraint set of a zero-knowledge proof circuit, wherein the constraint set includes a range attribute verification condition, and the range attribute verification condition is used for verifying whether an attribute value of personal information is within a constraint range of a threshold value;

the personal information credential generation module 302 is configured to receive a verifiable representation, use the verifiable representation as a secret input of the zero-knowledge proof circuit, and generate a personal information credential by means of the zero-knowledge proof circuit, wherein the verifiable representation is generated by an issuing system a personal information credential and the holding system of a personal information credential based on personal information to be verified; and the personal information credential verification module 303 is configured to: in response to receiving decentralized identity information and the threshold value, which are sent by a verification system of the personal information credential, use the decentralized identity information and the threshold value as public inputs of the zero-knowledge proof circuit, and verify, by the zero-knowledge proof circuit, whether the personal information credential satisfies the constraint set.

The issuing system is configured to generate the personal information credential based on the personal information to be verified, and the personal information credential includes a signature of the issuing system.

The holding system is configured to perform encapsulation based on the personal information credential issued by the issuing system to obtain the verifiable representation, and the verifiable representation includes a signature of the holding system.

The constraint set constructed by the constraint set construction module 301 further includes a first constraint condition and a second constraint condition, wherein the first constraint condition is used for verifying the signature of the holding system, and the second constraint condition is used for verifying the signature of the issuing system.

The information verification apparatus 300 may further include a key generation module, configured to generate a key of the holding system and a key of the verification system, wherein the key of the holding system is used for generating the personal information credential, and the key of the verification system is used for verifying the personal information credential.

The personal information credential generation module 302 may be configured to: use the verifiable representation as a parameter of an assignment function of the zero-knowledge proof circuit, and assign an attribute variable of the personal information credential in the constraint set of the zero-knowledge proof circuit by the assignment function to obtain the attribute value of the personal information; and use the key of the holding system as a parameter of a proof generation function in a preset zero-knowledge proof algorithm, and generate the personal information credential by invoking the proof generation function.

The decentralized identity information sent by the verification system of the personal information credential includes first decentralized identity information of the issuing system and second decentralized identity information of the holding system.

The personal information credential verification module 303 may be configured to: use a public key of the issuing system in the first decentralized identity information, a public key of the holding system in the second decentralized identity information, the threshold value and the key of the verification system as parameters of a proof verification function in the preset zero-knowledge proof algorithm, and verify the personal information credential by invoking the proof verification function.

The preset zero-knowledge proof algorithm may be one of a zero-knowledge succinct non-interactive arguments of knowledge algorithm, a zero-knowledge scalability transparent arguments of knowledge algorithm, and a transparent zero-knowledge verifiable polynomial delegation algorithm.

The attribute value of the personal information may include at least one of age, height, weight, and account amount.

In addition, the implementation content of the information verification apparatus in the embodiment of the present disclosure has been described in detail in the above information verification method, and thus repeated content is not described again.

Figure 4:
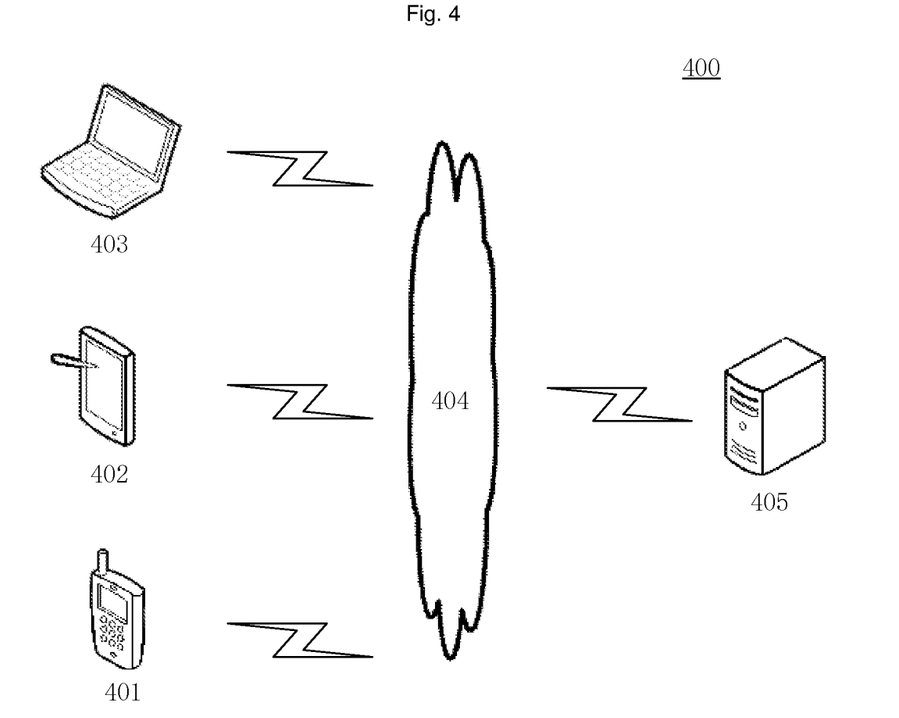
FIG. 4 is a diagram of an exemplary system architecture in which an embodiment of the present disclosure may be applied.

FIG. 4 illustrates an exemplary system architecture 400 which may apply the information verification method or the information verification apparatus according to the embodiment of the present disclosure.

As shown in FIG. 4, the system architecture 400 may include terminal devices 401, 402, 403, a network 404, and a server 405. The network 404 is configured to provide a medium of communication links among the terminal devices 401, 402, 403 and the server 405. The network 404 may include various connection types, such as wired, wireless communication links or optical fiber cables, etc.

The user may use the terminal devices 401, 402, 403 to interact with the server 405 through the network 404, to receive or send messages, etc. Various communication client applications, such as shopping applications, webpage browser applications, search applications, instant messaging tools, mailbox clients, social platform software and the like (merely examples) may be installed on the terminal devices 401, 402, 403.

The terminal devices 401, 402, 403 may be various electronic devices having display screens and supporting webpage browsing, which include, but are not limited to, smart phones, tablet computers, laptop portable computers, desktop computers, etc.

The server 405 may be a server that provides various services, for example, a background management server (merely an example) that provides a support for a website browsed by the user using the terminal devices 401, 402, 403. The background management server may perform analysis and other processing on data such as a received information verification request, and feed back a processing result (e.g., an information verification result-merely an example) to the terminal devices.

It should be noted that the information verification method provided in the embodiment of the present disclosure is generally executed by the server 405, and correspondingly, the information verification apparatus is generally disposed in the server 405.

It should be understood that the number of the terminal devices, the networks and the servers in FIG. 4 is merely illustrative. According to implementation requirements, there may be any number of terminal devices, networks and servers.

Figure 5:
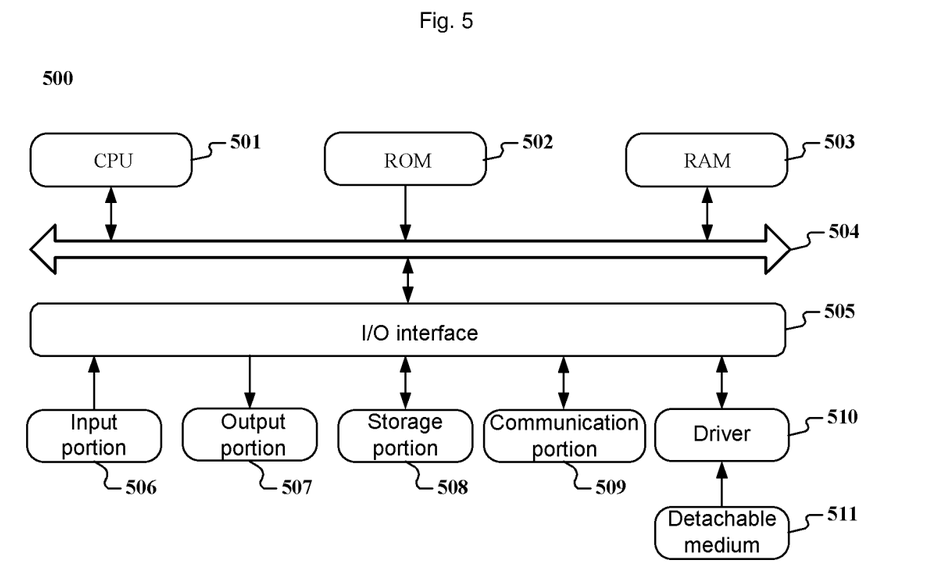
FIG. 5 is a schematic structural diagram of a computer system suitable for implementing a terminal device or a server according to an embodiment of the present disclosure.

Referring now to FIG. 5, it illustrates a schematic structural diagram of a computer system 500 suitable for implementing the terminal device or the server according to an embodiment of the present application. The terminal device or server shown in FIG. 5 is merely an example, and should not bring any limitation to the functions and use ranges of the embodiment of the present application.

As shown in FIG. 5, the computer system 500 includes a central processing unit (CPU) 501, which may perform various suitable actions and processes in accordance with a program stored in a read only memory (ROM) 502 or a program loaded from a storage portion 508 into a random access memory (RAM) 503. In the RAM 503, various programs and data needed by the operations of the system 500 are also stored. The CPU 501, the ROM 502 and the RAM 503 are connected to each other via a bus 504. An input/output (I/O) interface 505 is also connected to the bus 504.

The following components are connected to the I/O interface 505: an input portion 506, including a keyboard, a mouse, and the like; an output portion 507, including, for example, a cathode-ray tube (CRT), a liquid crystal display (LCD), a speaker, and the like; a storage portion 508, including a hard disk, and the like; and a communication portion 509, including a network interface card, such as an LAN card, a modem, and the like. The communication portion 509 performs communication processing by means of a network such as the Internet. A driver 510 is also connected to the I/O interface 505 as needed. A detachable medium 511, such as a magnetic disk, an optical disk, a magneto-optical disk, a semiconductor memory and the like, is installed on the driver 510 as needed, so that a computer program read therefrom is installed in the storage portion 508 as needed.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for performing the method illustrated in the flowcharts. In such embodiments, the computer program may be downloaded and installed from the network via the communication portion 509, or installed from the detachable medium 511. When the computer program is executed by the central processing unit (CPU) 501, the above functions defined in the system of the present application are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More examples of the computer-readable storage medium may include, but are not limited to: an electrical connection having one or more wires, a portable computer magnetic disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: wireless, an electrical wire, an optical cable, RF, and the like, or any suitable combination thereof.

The flowcharts and block diagrams in the drawings illustrate the system architecture, functions and operations of possible implementations of systems, methods and computer program products according to various embodiments of the present application. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The modules involved in the embodiments of the present disclosure may be implemented in a software or hardware manner. The described modules may also be disposed in a processor, for example, it may be described as: a processor, including a constraint set construction module, a personal information credential generation module and a personal information credential verification module. The names of these modules do not constitute limitations of the modules themselves in a certain case. For example, the constraint set construction module may also be described as "a module for constructing a constraint set of a zero-knowledge proof circuit".

As another aspect, the present disclosure further provides a computer-readable medium, wherein the computer-readable medium may be contained in the device described in the above embodiments, and it may also be present separately and is not assembled into the device. The computer-readable medium stores at least one computer program, and when the at least one computer program is executed by the device, the device performs the following operations: constructing a constraint set of a zero-knowledge proof circuit, wherein the constraint set includes a range attribute verification condition, and the range attribute verification condition is used for verifying whether an attribute value of personal information is within the constraint range of a threshold value; receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential according to personal information to be verified; and in response to receiving decentralized identity information and the threshold value, which are sent by a verification system of the personal information credential, using the decentralized identity information and the threshold value as public inputs of the zero-knowledge proof circuit, and verifying, by the zero-knowledge proof circuit, whether the personal information credential satisfies the constraint set.

In the solutions according to the embodiments of the present disclosure, the constraint set of a zero-knowledge proof circuit is constructed, wherein the constraint set includes a range attribute verification condition, and the range attribute verification condition is used for verifying whether an attribute value of personal information is within the constraint range of a threshold value; a verifiable representation is received, the verifiable representation is used as a secret input of the zero-knowledge proof circuit, and a personal information credential is generated by the zero-knowledge proof circuit, wherein the verifiable representation is generated by an issuing system and a holding system of a personal information credential based on personal information to be verified; and after receiving decentralized identity information and the threshold value, which are sent by a verification system of the personal information credential, the decentralized identity information and the threshold value are used as public inputs of the zero-knowledge proof circuit, and by the zero-knowledge proof circuit, whether the personal information credential satisfies the constraint set is verified. Sensitive information during user information verification can be protected while maintaining a decentralized identity system, thereby avoiding directly showing plaintext of real information of the user, and the verification efficiency is high.

The foregoing implementations do not constitute a limitation on the protection scope of the present disclosure. It should be understood by those skilled in the art that, a wide variety of modifications, combinations, sub-combinations and substitutions may occur depending on design requirements and other factors. Any modifications, equivalent replacements, improvements and the like, made within the spirit and principle of the present disclosure, should be included within the protection scope of the present disclosure.

What is claimed is:

1. An information verification method, comprising:
constructing a constraint set of a zero-knowledge proof circuit, wherein the constraint set comprises a range attribute verification condition, and the range attribute verification condition is used for verifying whether an attribute value of personal information is within a constraint range of a threshold value;
receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential based on personal information to be verified;
in response to receiving decentralized identity information and the threshold value, which are sent by a verification system of the personal information credential, using the decentralized identity information and the threshold value as public inputs of the zero-knowledge proof circuit, and verifying, by the zero-knowledge proof circuit, whether the personal information credential satisfies the constraint set.

2. The method as claimed in claim 1, wherein the issuing system is configured to generate the personal information credential based on the personal information to be verified, the personal information credential comprises a signature of the issuing system, the holding system is configured to perform encapsulation based on the personal information credential issued by the issuing system to obtain the verifiable representation, and the verifiable representation comprises a signature of the holding system;
the constraint set further comprises a first constraint condition and a second constraint condition, wherein the first constraint condition is used for verifying the signature of the holding system, and the second constraint condition is used for verifying the signature of the issuing system.

3. The method as claimed in claim 2, the method further comprising: generating a key of the holding system and a key of the verification system, wherein the key of the holding system is used for generating the personal information credential, and the key of the verification system is used for verifying the personal information credential.

4. The method as claimed in claim 3, wherein using the verifiable representation as the secret input of the zero-knowledge proof circuit, and generating the personal information credential by the zero-knowledge proof circuit, comprises:
using the verifiable representation as a parameter of an assignment function of the zero-knowledge proof circuit, and assigning an attribute variable of the personal information credential in the constraint set of the zero-knowledge proof circuit by the assignment function, to obtain the attribute value of the personal information;
using the key of the holding system as a parameter of a proof generation function in a preset zero-knowledge proof algorithm, and generating the personal information credential by invoking the proof generation function.

5. The method as claimed in claim 4, wherein the preset zero-knowledge proof algorithm is one of a zero-knowledge succinct non-interactive arguments of knowledge algorithm, a zero-knowledge scalability transparent arguments of knowledge algorithm, and a transparent zero-knowledge verifiable polynomial delegation algorithm.

6. The method as claimed in claim 3, wherein the decentralized identity information sent by the verification system of the personal information credential comprises first decentralized identity information of the issuing system and second decentralized identity information of the holding system;
wherein using the decentralized identity information and the threshold value as public inputs of the zero-knowledge proof circuit, and verifying, by the zero-knowledge proof circuit, whether the personal information credential satisfies the constraint set, comprises:
using a public key of the issuing system in the first decentralized identity information, a public key of the holding system in the second decentralized identity information, the threshold value and the key of the verification system as parameters of a proof verification function in the preset zero-knowledge proof algorithm, and verifying the personal information credential by invoking the proof verification function.

7. The method as claimed in claim 1, wherein the attribute value of the personal information comprises at least one of age, height, weight, and account amount.

8. An electronic device, comprising:
at least one processor; and
a memory, configured to store at least one program, wherein,
when the at least one program is executed by the at least one processor, the at least one processor is enabled to implement following actions:
constructing a constraint set of a zero-knowledge proof circuit, wherein the constraint set comprises a range attribute verification condition, and the range attribute verification condition is used for verifying whether an attribute value of personal information is within a constraint range of a threshold value;

receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential based on personal information to be verified;

in response to receiving decentralized identity information and the threshold value, which are sent by a verification system of the personal information credential, using the decentralized identity information and the threshold value as public inputs of the zero-knowledge proof circuit, and verifying, by the zero-knowledge proof circuit, whether the personal information credential satisfies the constraint set.

9. The electronic device as claimed in claim 8, wherein the issuing system is configured to generate the personal information credential based on the personal information to be verified, the personal information credential comprises a signature of the issuing system, the holding system is configured to perform encapsulation based on the personal information credential issued by the issuing system to obtain the verifiable representation, and the verifiable representation comprises a signature of the holding system;

the constraint set further comprises a first constraint condition and a second constraint condition, wherein the first constraint condition is used for verifying the signature of the holding system, and the second constraint condition is used for verifying the signature of the issuing system.

10. The electronic device as claimed in claim 9, wherein the at least one program is executed by the at least one processor, the at least one processor is enabled to implement following actions:

generate a key of the holding system and a key of the verification system, wherein the key of the holding system is used for generating the personal information credential, and the key of the verification system is used for verifying the personal information credential.

11. The electronic device as claimed in claim 10, wherein the at least one program is executed by the at least one processor, the at least one processor is enabled to implement following actions:

use the verifiable representation as a parameter of an assignment function of the zero-knowledge proof circuit, and assign an attribute variable of the personal information credential in the constraint set of the zero-knowledge proof circuit by the assignment function, to obtain the attribute value of the personal information;

use the key of the holding system as a parameter of a proof generation function in a preset zero-knowledge proof algorithm, and generate the personal information credential by invoking the proof generation function.

12. The electronic device as claimed in claim 11, wherein the preset zero-knowledge proof algorithm is one of a zero-knowledge succinct non-interactive arguments of knowledge algorithm, a zero-knowledge scalability transparent arguments of knowledge algorithm, and a transparent zero-knowledge verifiable polynomial delegation algorithm.

13. The electronic device as claimed in claim 10, wherein the decentralized identity information sent by the verification system of the personal information credential comprises first decentralized identity information of the issuing system and second decentralized identity information of the holding system;

the at least one program is executed by the at least one processor, the at least one processor is enabled to implement following actions:

use a public key of the issuing system in the first decentralized identity information, a public key of the holding system in the second decentralized identity information, the threshold value and the key of the verification system as parameters of a proof verification function in the preset zero-knowledge proof algorithm, and verify the personal information credential by invoking the proof verification function.

14. The electronic device as claimed in claim 8, wherein the attribute value of the personal information comprises at least one of age, height, weight, and account amount.

15. A computer-readable medium, wherein the computer-readable medium stores a computer program, wherein the computer program, when executed by a processor, the processor is enabled to implement following actions:

constructing a constraint set of a zero-knowledge proof circuit, wherein the constraint set comprises a range attribute verification condition, and the range attribute verification condition is used for verifying whether an attribute value of personal information is within a constraint range of a threshold value;

receiving a verifiable representation, using the verifiable representation as a secret input of the zero-knowledge proof circuit, and generating a personal information credential by the zero-knowledge proof circuit, wherein the verifiable representation is generated by an issuing system of a personal information credential and a holding system of the personal information credential based on personal information to be verified;

in response to receiving decentralized identity information and the threshold value, which are sent by a verification system of the personal information credential, using the decentralized identity information and the threshold value as public inputs of the zero-knowledge proof circuit, and verifying, by the zero-knowledge proof circuit, whether the personal information credential satisfies the constraint set.

16. The computer-readable medium as claimed in claim 15, wherein the issuing system is configured to generate the personal information credential based on the personal information to be verified, the personal information credential comprises a signature of the issuing system, the holding system is configured to perform encapsulation based on the personal information credential issued by the issuing system to obtain the verifiable representation, and the verifiable representation comprises a signature of the holding system;

the constraint set further comprises a first constraint condition and a second constraint condition, wherein the first constraint condition is used for verifying the signature of the holding system, and the second constraint condition is used for verifying the signature of the issuing system.

17. The computer-readable medium as claimed in claim 16, the computer program, when executed by a processor, the processor is enabled to implement following actions:

generate a key of the holding system and a key of the verification system, wherein the key of the holding system is used for generating the personal information credential, and the key of the verification system is used for verifying the personal information credential.

18. The computer-readable medium as claimed in claim 17, the computer program, when executed by a processor, the processor is enabled to implement following actions:
use the verifiable representation as a parameter of an assignment function of the zero-knowledge proof circuit, and assign an attribute variable of the personal information credential in the constraint set of the zero-knowledge proof circuit by the assignment function, to obtain the attribute value of the personal information;
use the key of the holding system as a parameter of a proof generation function in a preset zero-knowledge proof algorithm, and generate the personal information credential by invoking the proof generation function.

19. The computer-readable medium as claimed in claim 17, wherein the decentralized identity information sent by the verification system of the personal information credential comprises first decentralized identity information of the issuing system and second decentralized identity information of the holding system; the at least one program is executed by the at least one processor, the at least one processor is enabled to implement following actions:
use a public key of the issuing system in the first decentralized identity information, a public key of the holding system in the second decentralized identity information, the threshold value and the key of the verification system as parameters of a proof verification function in the preset zero-knowledge proof algorithm, and verify the personal information credential by invoking the proof verification function.

20. The computer-readable medium as claimed in claim 17, wherein the preset zero-knowledge proof algorithm is one of a zero-knowledge succinct non-interactive arguments of knowledge algorithm, a zero-knowledge scalability transparent arguments of knowledge algorithm, and a transparent zero-knowledge verifiable polynomial delegation algorithm.

* * * * *